(12) United States Patent
Pingel et al.

(10) Patent No.: US 7,942,048 B2
(45) Date of Patent: May 17, 2011

(54) SYSTEM FOR DETECTING THE PRESSURE IN A VEHICLE TIRE AND/OR THE SPEED OF THE VEHICLE

(75) Inventors: Ulrich Pingel, Marl (DE); Martin Pingel, Marl (DE)

(73) Assignee: Ventech GmbH, Marl (DE)

( * ) Notice: Subject to any disclaimer, the term of this patent is extended or adjusted under 35 U.S.C. 154(b) by 59 days.

(21) Appl. No.: 12/311,038

(22) PCT Filed: Sep. 13, 2007

(86) PCT No.: PCT/DE2007/001633
§ 371 (c)(1),
(2), (4) Date: Nov. 17, 2009

(87) PCT Pub. No.: WO2008/034411
PCT Pub. Date: Mar. 27, 2008

(65) Prior Publication Data
US 2010/0058852 A1    Mar. 11, 2010

(30) Foreign Application Priority Data

Sep. 19, 2006  (DE) .......................... 10 2006 044 585

(51) Int. Cl.
*B60C 23/02* (2006.01)
(52) U.S. Cl. ...................................... 73/146.5
(58) Field of Classification Search .................. None
See application file for complete search history.

(56) References Cited

U.S. PATENT DOCUMENTS

| | | | | |
|---|---|---|---|---|
| 4,084,431 A * | 4/1978 | Newby | .......................... | 73/146.2 |
| 4,355,299 A * | 10/1982 | Cook, Jr. | .......................... | 73/146.2 |
| 4,630,470 A * | 12/1986 | Brooke et al. | .................. | 73/146.2 |
| 5,269,186 A * | 12/1993 | Yopp | .......................... | 73/457 |
| 5,396,817 A | 3/1995 | Rosensweig | | |
| 5,445,020 A | 8/1995 | Rosensweig | | |
| 6,561,018 B2 * | 5/2003 | Mancosu et al. | ................ | 73/146 |
| 6,626,035 B1 | 9/2003 | Dent et al. | | |
| 7,222,522 B2 | 5/2007 | Monguzzi et al. | | |
| 2008/0209995 A1 | 9/2008 | Taylor et al. | | |
| 2010/0292953 A1 * | 11/2010 | Pingel | .......................... | 702/138 |

FOREIGN PATENT DOCUMENTS

| | | |
|---|---|---|
| DE | 202 00 489 U1 | 7/2002 |
| EP | 0 656 269 A1 | 6/1995 |
| WO | WO 00/11442 A1 | 3/2000 |
| WO | WO 2006/003467 A1 | 1/2006 |

* cited by examiner

*Primary Examiner* — Andre J Allen
(74) *Attorney, Agent, or Firm* — Marshall & Melhorn, LLC

(57) ABSTRACT

A system for detecting the pressure in a pneumatic vehicle tire which is mounted on a vehicle and/or the speed of the vehicle, having an arrangement composed of load sensors which supplies force signals for a two-dimensional pattern of the distribution of force which is exerted by the vehicle tire in contact with the sensors when the vehicle moves over the arrangement, a computer which is programmed in such a way that it defines the tire pressure and/or the speed on the basis of the distribution of force independently of the method of manufacture or the model of the tire and of the vehicle, and a device for displaying the pressure and/or the speed, is characterized in that the arrangement composed of load sensors comprises at least two series of load sensors which are arranged one behind the other in the direction of travel, wherein at least one row of load sensors is offset with respect to one or more rows of the load sensors by a predetermined absolute value transversely with respect to the direction of travel.

8 Claims, 2 Drawing Sheets

SYSTEM FOR DETECTING THE PRESSURE IN A VEHICLE TIRE AND/OR THE SPEED OF THE VEHICLE

This invention relates to a system for detecting the pressure in a pneumatic vehicle tire which is mounted on a vehicle and/or the speed of the vehicle, with an array consisting of load sensors which supplies force signals for a two-dimensional pattern of the distribution of force which is exerted by the vehicle tire in contact with the sensors when the vehicle moves over the array, with a computer which is programmed so that it determines the tire pressure and/or the speed on the basis of the distribution of force independently of the method of manufacture or the model of the tire and or the vehicle, and a device for displaying the pressure and/or the speed.

A system of this type for the determination of the pressure in a pneumatic vehicle tire is described in U.S. Pat. No. 5,396,817. In this system of the prior art, an arrangement of force sensors in horizontal lines is described, over which the vehicle tire rolls. The speed can thereby be determined by the leading and trailing edges of the signal as the tires run over the array of load sensors. However, the measurement of speed by means of the gradient of the edges of the signal is a function of the tire pressure and is very inaccurate on account of tread factors.

WO 00/11/11422 describes an apparatus and a method for the measurement of the tire pressure, whereby this apparatus is fastened to the wheel of the vehicle and whereby the wheel is in communication via a contact surface with the substrate, and whereby the apparatus has one or more sensors inside the substrate, whereby each sensor is designed to measure the average contact pressure via the sensor between the tire and the substrate, and whereby the apparatus also has processing means for the determination of the average contact pressure between the tire and the substrate from the signal of a single sensor, or from a plurality of sensors inside the contact surface, to provide a first approximation of a measurement of the tire pressure.

WO 2006/003467 describes a system for checking a vehicle tire and for an evaluation of the tread of a vehicle tire, for the measurement of the tire pressure, as well as additional parameters such as the weight of the vehicle. For that purpose, a sequence of measurements is taken to collect data regarding the overall tire imprint, whereby the measurement elements are designed to determine the characteristics of the tread of a tire. For that purpose the sensors have flexible segments which penetrate into the tire tread, to thereby indicate an insufficient tread depth, for example.

US 2006/0123897 relates to a method for the measurement of at least one characteristic parameter of a pneumatic vehicle tire using deformable sensors, whereby an electrical signal is determined as a function of the deformation rate of each sensor. The at least one characteristic parameter of the tire is determined from the electrical signal, whereby the deformation of the deformable sensor is determined in two directions measured at a right angle to each other, and whereby the orientation of two sensor dimensions is oriented both to the direction of movement and to one dimension of the tire. It is thereby possible, for example, to measure the tire footprint, for example, or the pressure distribution of the tire over the tire footprint.

However, interference caused by the tire tread cannot be taken into consideration in this system of the prior art. In particular, the leading edge of the signal is significantly altered by the transverse tread of the tires, for example transverse grooves or diagonal grooves in the tread, and it must therefore be assumed that the leading edge of the signal no longer follows a linear path.

The object of this invention is therefore to make available a system for the determination of the pressure in a pneumatic vehicle tire and/or the speed of a vehicle in which the influence of the tire tread is reduced as far as possible.

This object is accomplished by the system described in Claim 1. Advantageous configurations of the invention are described in the dependent claims.

The system claimed by the invention for the determination of the pressure in a pneumatic vehicle tire which is mounted on a vehicle and/or the speed of the vehicle comprises an array of load sensors which supplies force signals for a two-dimensional pattern of the distribution of force which is exerted by the vehicle tire in contact with the sensors when the vehicle moves over the array, with a computer which is programmed so that it determines the tire pressure and/or the speed on the basis of the distribution of force independently of the method of manufacture or the model of the tire and or the vehicle, and a device for displaying the pressure and/or the speed, and is characterized in that the array comprises load sensors in at least two rows of load sensors which are arranged one behind the other in the direction of travel, whereby at least one row of load sensors is offset with respect to one or more rows of load sensors by a predetermined amount transverse to the direction of travel.

The predetermined amount must not be smaller than the dimension of a load sensor transverse to the direction of travel. In general, identical load sensors arranged in a row are used.

On at least one of the rows of load sensors, the length of the load sensors can be greater than in at least one other row of the load sensors. A short load sensor thereby reduces the compensation effort required when there is a high tire pressure with a simultaneously low load. With a long sensor, the transverse grooves are more effectively evened out.

Overall it is advantageous to provide a plurality of rows with relatively short load sensors, although the number of load sensors required is thereby increased and the cost of the system rises. On the other hand, the system also yields more useful information.

The measurement principle claimed by the invention, from a physical point of view, is a compromise between the longest possible sensor surface area, which is desirable because it minimizes tread effects, and the shortest possible sensor surface. The contact length of a tire in the longitudinal direction with high air pressure and a low load is only very short. Unless additional compensation is provided, a contact length which is shorter than the length of the sensor surface results in significant measurement inaccuracies. This significantly limits the possible range for the sensor length.

The individual sensor surfaces should be as close together and tightly packed as possible, preferably both in the direction of travel as well as transverse to the direction of travel.

As a result of the offset arrangement of the sensor elements, the individual sensor surfaces can also be made wider than the actual distance between sensors transverse to the direction of travel, although without significantly reducing the local resolution.

Overall, the interference caused by longitudinal grooves of the tread can be reliably minimized, because the effect caused by the longitudinal grooves can be evened out. For that purpose, a wide-area coverage with load sensors is optimal, because in that case a longitudinal groove can be detected in any case.

The invention teaches that it is advantageous to provide a computer unit which calculates the center of gravity for signals from a first row of load sensors and for signals from a second row of load sensors according to $$p = \frac{\sum (I_p \cdot p)}{\sum I_p}$$

whereby $I_p$ is the intensity at the location p and whereby the center of gravity $p_t$ was traversed at time t, and from the difference of the center of gravity $p_{t2}$ of the second row of load sensors and the center of gravity $p_{t1}$ of the first row of load sensors, the speed v is determined according to $$v = \frac{p_{t2} - p_{t1}}{t_2 - t_1}.$$

The speed of the vehicle and its acceleration can then be very accurately calculated from the time difference of the signals from the two rows.

It is thereby preferable for the load sensors to be read simultaneously or quasi-simultaneously. In the quasi-simultaneous method, the data are read in so quickly that there are no significant delays or measurement errors, or appropriate corrective measures are taken.

The exact contact length of the tire on each sensor length can be calculated with the use of the speed information by converting the force signal into length units and subtracting the sensor length. In the event that the contact length is less than the sensor length or is in the range of the sensor length, it is advantageous to perform a compensation calculation. In many cases a linear compensation is sufficient.

It should be noted that the speed measurement is not absolutely necessary for the determination of the tire pressure. It can also be performed independently. In the method claimed by the invention for the determination of the speed, the effects of tread, tracking and toeing are reduced.

As a result of a differential consideration, in particular of the leading edge of the signals, tread effects are made visible and can be taken into consideration.

In particular, the tread depth leaves a characteristic signal with the typical conical tread notch. At a greater tread depth, the tread grooves are very deep and wide and leave high signal levels in the transverse as well as in the longitudinal direction. As the tread depth decreases, the tread groove also becomes narrower, which reduces the signal amplitude. It thereby becomes possible to easily derive the tread depth. The invention therefore teaches that a computer unit determines the tread depth of the tire using the amplitude of the force signals in the direction of travel and/or transverse to the direction of travel.

An additional functional capability of the system is a determination of the weight of the vehicle. The load that each individual tire is required to bear can be determined by the integration of the measured tire pressures over the distance traveled and the width of the tire. The axle weight or the total weight of the vehicle is determined by adding up the loads of the individual tires of the axle or of the vehicle.

An easy type of installation for the system is its direct placement on the surface of the road, where it is generally protected by an entry and exit ramp. This method of installation can be performed easily and quickly, although it has disadvantages which are created by the vertical acceleration of the axle. In particular, sudden load changes can occur, or a partial skipping of the sensor, and lead to increased measurement deviations, in addition to increased load and wear on the sensor plates.

Particularly good accuracy and a minimization of the load of the measurement system can be achieved by recessing the sensor plates in the ground or floor flush with the surface so that the vehicle axle does not have to execute any vertical movement of the type that can be caused by a ramp etc., and so that there are no interfering vibrations of the tire or the axle.

The invention is explained in greater detail below with reference to the exemplary embodiment illustrated in the accompanying drawings, in which.

In the figures, the direction of travel is indicated by the arrow A. A first row 10 of load sensors, e.g. 1, 3, 5 etc. is offset in relation to a second row 20 of load sensors, e.g. 2, 4, 6, etc. by an amount x transverse to the direction of travel. The time lapse generated by the speed of the vehicle as the tire contacts the two rows 10, 20 can thereby also be used to calculate this speed. The advantage is that the number of sensors required is only the number used in a row in the prior art, although the invention has the advantage that it also measures the speed. The load sensors are thereby not connected in electrical series, but in parallel, or they must at least be read in parallel by the computer.

The sensor surfaces must be located at some distance from one another so that they do not overlap. Therefore narrow gaps remain between the sensor surfaces.

The offset arrangement makes it possible to enlarge or expand the individual sensor surfaces up to twice the difference between the load sensors. This measure makes it possible to significantly reduce the interference caused by the tire tread or significant resolution losses.

Figure 1:
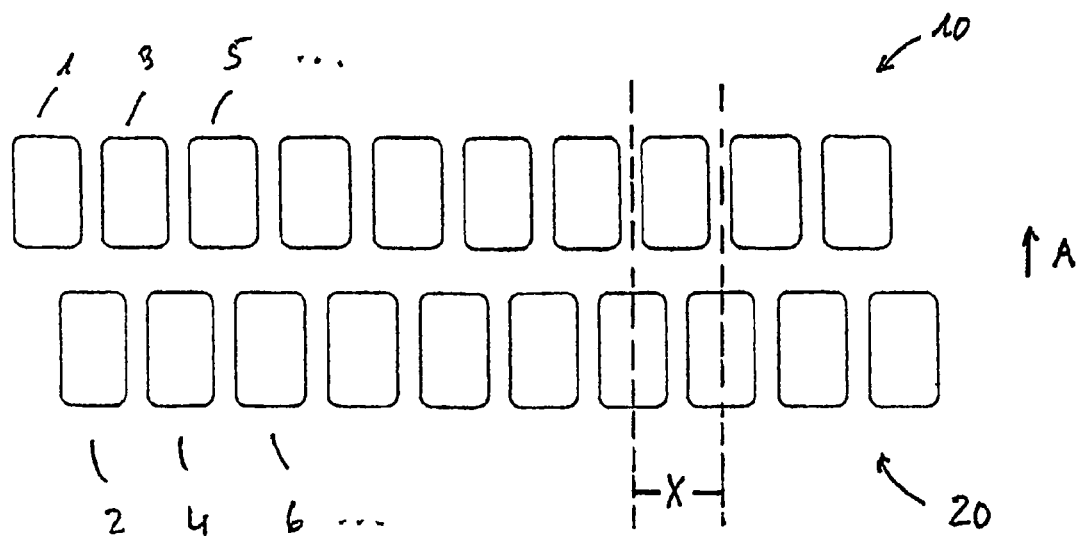
FIG. 1 shows a first example of an array of load sensors, in which load sensors in a first row are offset from the load sensors of a second row in the direction of travel A of a vehicle.
Figure 2:
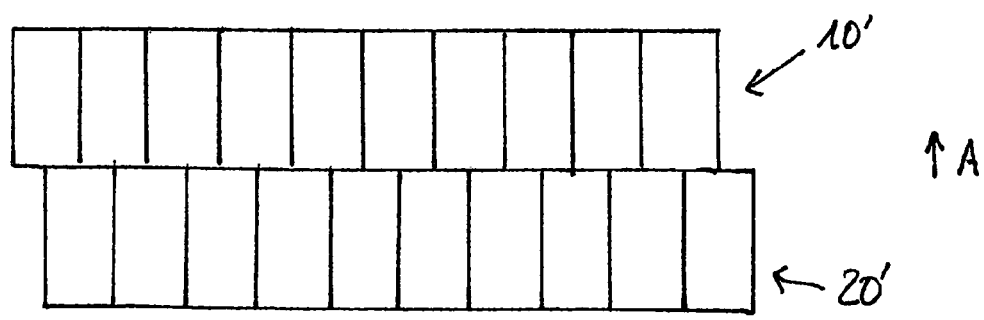
FIG. 2 shows a second example of an array of load sensors.

FIG. 2 shows one example of an array that consists of two rows 10', 20' of load sensors which are tightly packed both in the direction of travel A and transverse to the direction of travel. Therefore the narrow gaps that are present in the embodiment illustrated in FIG. 1 are completely eliminated and the influence of longitudinal grooves can be measured and compensated for, if necessary.

Figure 3:
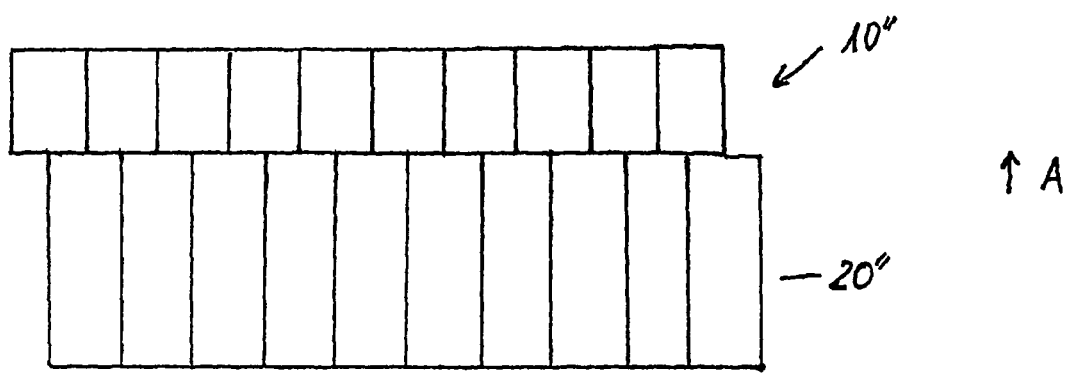
FIG. 3 shows a third example of an array of load sensors.

FIG. 3 shows one example of an array of load sensors in which a first row 10" of load sensors and a second row 20" of load sensors have different sensor lengths in the direction of travel. As a result, the influence of the tread can be greatly reduced, and the actual contact length of a tire with a low load and high pressure can be determined more accurately.

Figure 4:
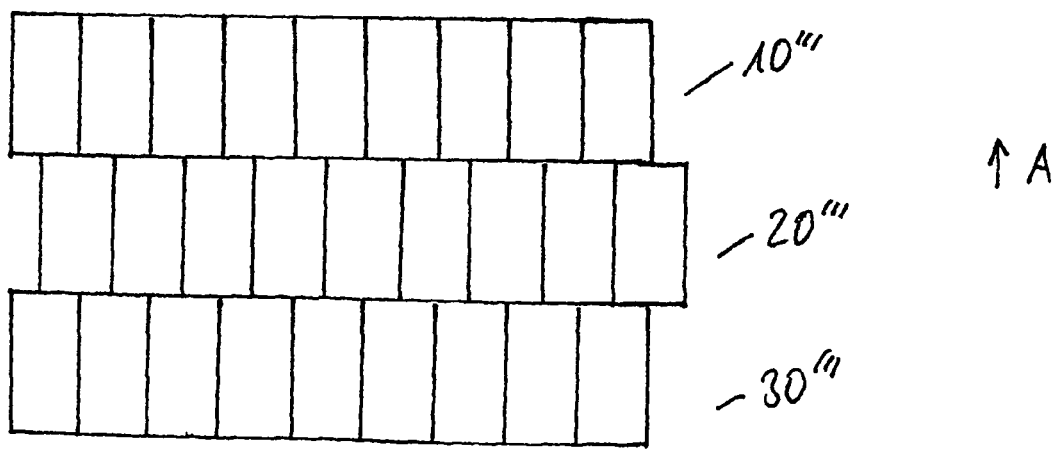
FIG. 4 shows a fourth example of an array of load sensors.

FIG. 4 shows an example of an array of load sensors in which there are three rows 10''', 20''', 30''' of load sensors with equal sensor lengths. It is absolutely advantageous to provide two or more rows of load sensors. Because redundant information is thus obtained, the result becomes more reliable. On the other hand, the array also becomes that much more expensive.

Additional variations of the arrays of load sensors are possible. If redundant information is required, four or more rows of load sensors can also be provided, whereby the sensor lengths in the individual rows can be the same or different. The accompanying drawings show only that two rows are offset from each other by one-half the width of a sensor. Other offsets are also possible, for example by ¼ of the sensor width or any other fraction thereof.

The features of the invention disclosed in the preceding description, in the drawing and in the claims can be considered essential to the invention both individually and in any possible combination for the realization of the invention.

The invention claimed is:

1. A system for the determination of the pressure in a pneumatic vehicle tire which is mounted on a vehicle and or the speed of the vehicle, comprising:
   an array of load sensors which supplies force signals for a two-dimensional pattern of the distribution of force which is exerted by the vehicle tire in contact with the sensors when the vehicle moves over the array;
   a computer which is programmed so that it determines the tire pressure and/or the speed on the basis of the distribution of force independently of the method of manufacture or the model of the tire and or the vehicle; and
   a device for displaying the pressure and/or the speed;
   wherein the array comprises load sensors in at least two rows of load sensors which are arranged one behind the other in the direction of travel, whereby at least one row of load sensors is offset with respect to one or more rows of load sensors by a predetermined amount transverse to the direction of travel, and
   wherein a computer unit is adapted to perform a differential analysis of the leading edge of the force signals to detect and compensate for tread effects of the tire.

2. The system according to claim 1, wherein the predetermined amount is smaller than the dimension of a load sensor in the direction transverse to the direction of travel.

3. The system according to claim 1 wherein at least one of the rows of load sensors, the length of the load sensors is greater than in at least one other row of load sensors.

4. The system according to claim 1, wherein the load sensors are read simultaneously or quasi-simultaneously.

5. The system according to claim 1, wherein a computer unit is provided which converts the force signal generated by the load sensors into length units and calculates the exact contact length of the tire on the surface of each of the load sensors from the length of the force signal minus the length of the corresponding load sensor.

6. The system according to claim 1, wherein a computer unit is provided which calculates the respective center of gravity for signals from a first row of load sensors and for signals from a second row of load sensors according to $$p = \frac{\sum (I_p \cdot p)}{\sum I_p}$$

whereby $I_p$ is the intensity at the location p and whereby the center of gravity $p_t$ was traversed at time t, and from the difference of the center of gravity $p_{t2}$ of the second row of load sensors and the center of gravity $p_{t1}$ of the first row of load sensors, the speed v is determined according to $$v = \frac{p_{t2} - p_{t1}}{t_2 - t_1}.$$

7. The system according to claim 1, wherein, if the contact length of the tire is less than the length of one or more of the load sensors, a compensation calculation is performed.

8. The system according to claim 1, wherein a computer unit determines the tread depth of the tire using the amplitude of the force signals in the direction of travel and/or transverse to the direction of travel.

* * * * *